April 12, 1960  C. F. PAYNE  2,932,527
WHEELED CONVEYOR FOR TRANSPORTATION CONTAINERS
Filed Aug. 2, 1957  3 Sheets-Sheet 2

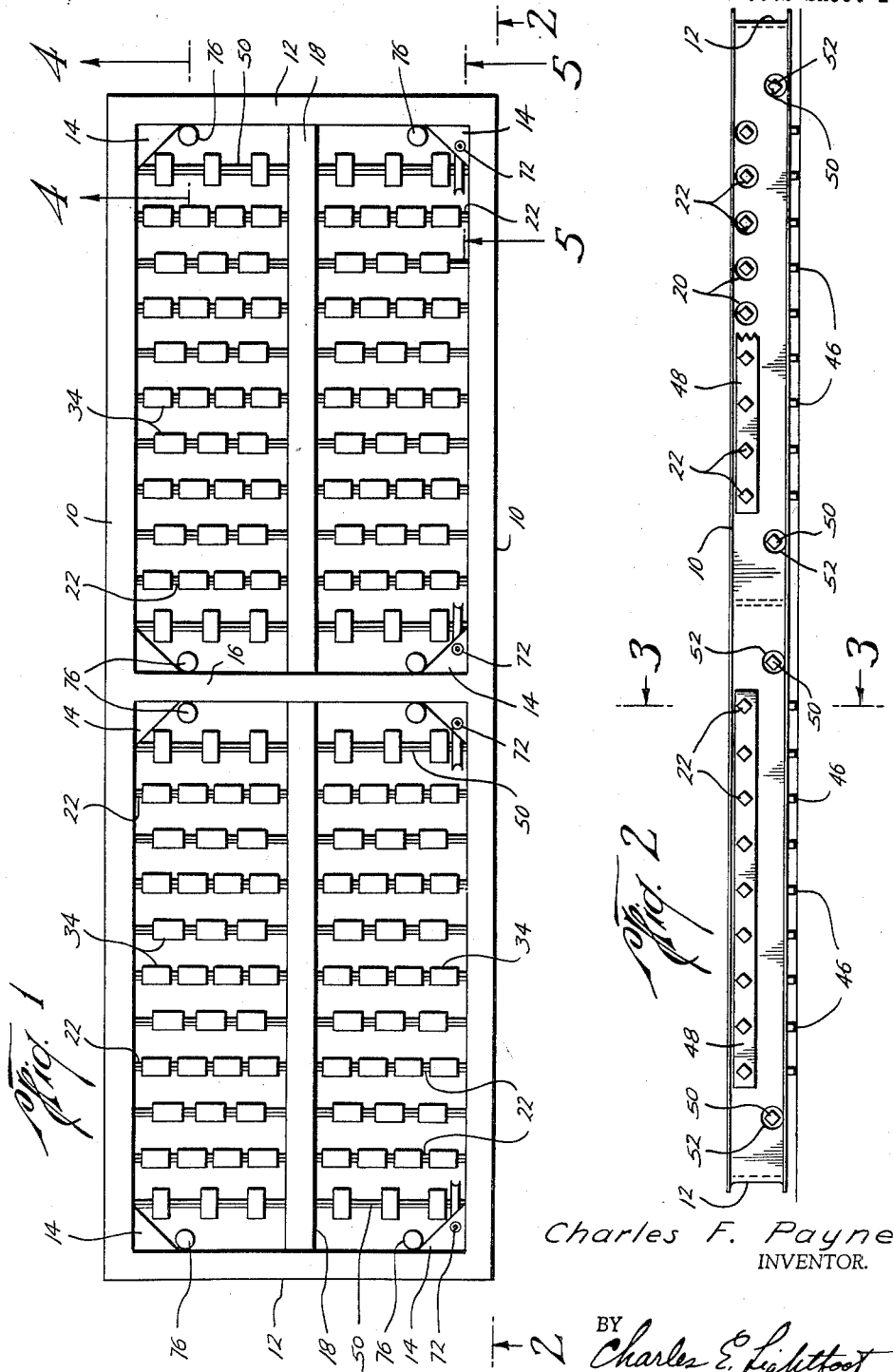

Charles F. Payne
INVENTOR.

BY
Charles E. Lightfoot
ATTORNEY

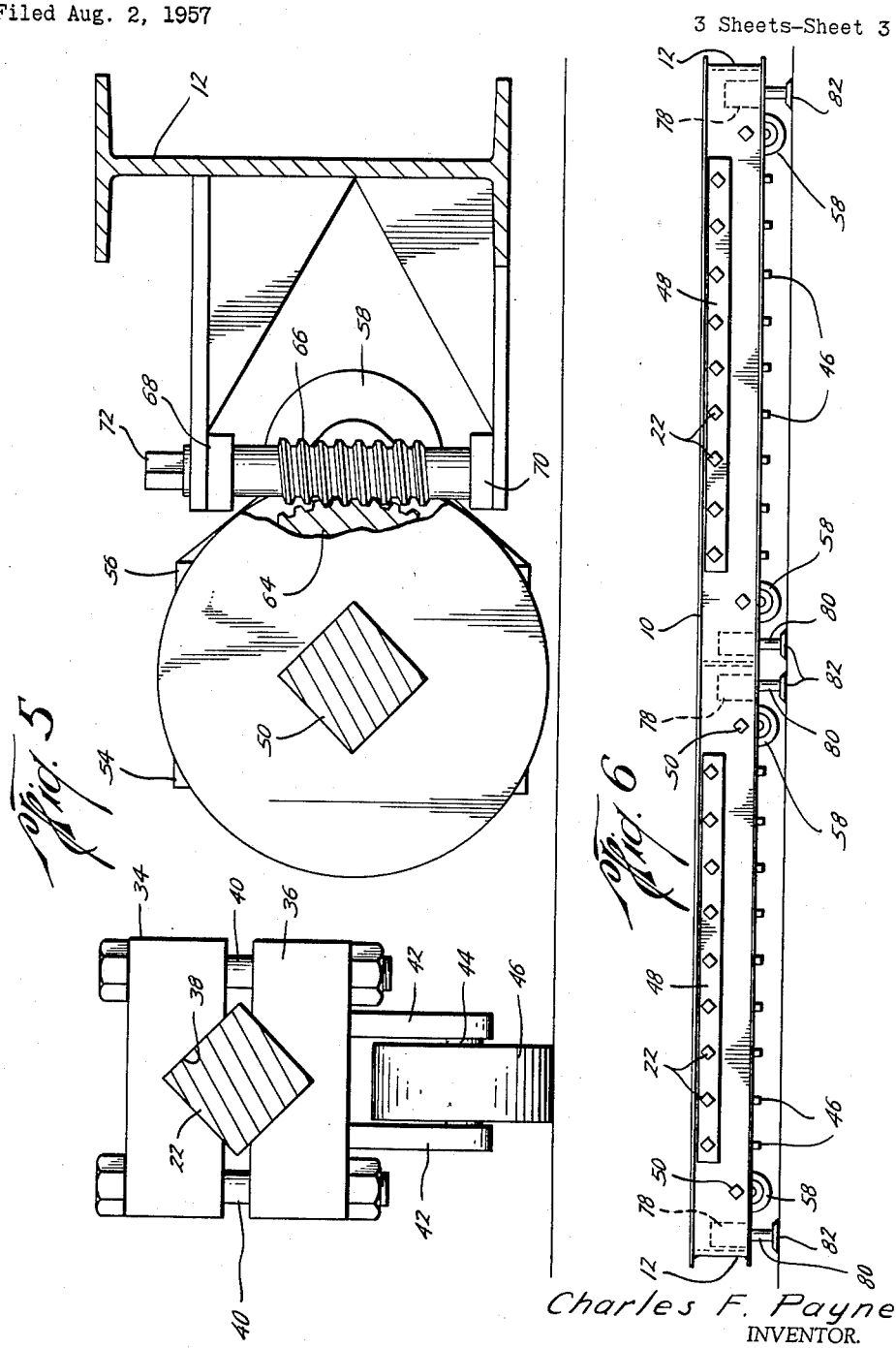

United States Patent Office 2,932,527
Patented Apr. 12, 1960

2,932,527

WHEELED CONVEYOR FOR TRANSPORTATION CONTAINERS

Charles F. Payne, Houston, Tex.

Application August 2, 1957, Serial No. 675,945

3 Claims. (Cl. 280—43.24)

This invention relates to a wheeled conveyor for transportation containers and more particularly to a conveyor or dolly for use in connection with transportation equipment of the kind sometimes referred to as a van, wagonlit or container, such as those of the type known as LCL or less-carload-lot containers.

The invention finds particular application in connection with transportation containers of the type mentioned, which are employed in the shipment of various kinds of goods on railroad cars and flat bed vehicles, and which are provided with means whereby they may be elevated above a supporting surface, such as a platform, to enable a wheeled conveyor or dolly to be inserted beneath them.

In the transportation of goods by the use of containers of the type referred to the positioning of the containers on and removing the same from vehicles, such as trucks or flat cars, station platforms or other supporting surfaces presents a difficult task necessitating the use of expensive load handling equipment such as over-head cranes, forklift apparatus, and the like, for the operation of which highly skilled operators must be employed.

The present invention has for an important object the provision of a wheeled conveyor or dolly for use with containers of the kind referred to which may be inserted beneath the container and which is designed to distribute the load of the container substantially uniformly over the area of the supporting surface beneath the container.

Another object of the invention is to provide a conveyor of the type mentioned which is easily moved about and positioned to be moved into place beneath a container which is to be handled thereby.

A further object of the invention is the provision of a conveyor of the kind referred to having container supporting wheels which are arranged to permit the conveyor to be rolled in directions to insert the same under or remove the same from beneath a container and having other wheels which may be positioned to support the conveyor for movement in directions at right angles to the direction of insertion or removal of the container.

Another object of the invention is to provide a wheeled conveyor or dolly having a generally rectangular frame and sets of wheels for supporting the frame for movement in different directions, one of said sets being movable to one position to support the frame independently of the other set for movement in one direction and to another position to permit the frame to be supported on said other set for movement in another direction.

A further object of the invention is the provision of a wheeled conveyor or dolly having a frame and sets of wheels carried on shafts rotatably mounted on the frame for rotation into and out of positions in which the wheels are extended downwardly from the frame for engagement with a supporting surface to support the frame for movement over such surface, and including means for supporting the frame above said surface with all of the wheels out of contact with the surface to permit the wheels to be moved into or out of their frame supporting positions.

Another object of the invention is to provide a conveyor or dolly of the character referred to having independently operable sets of wheels, one of which sets is movable into and out of a frame supporting position extending downwardly from the frame for engagement with a supporting surface to support the frame above said surface with the wheels of the other set out of contact with said surface.

A still further object of the invention is the provision of a conveyor or dolly of the character mentioned, which is of simple design and rugged construction, capable of withstanding the weight of heavy loads and the conditions of hard usage to which such equipment is likely to be subjected.

The above and other important objects and advantages of the invention may best be understood from the following detailed description, constituting a specification of the same when considered in conjunction with the annexed drawings, wherein:

Figure 1 is a top plan view, partly diagrammatic, illustrating a preferred embodiment of the invention;

Figure 2 is a side elevational view of the invention as illustrated in Figure 1 showing the conveyor with the load supporting wheels in position to engage a supporting surface to support a load for movement over such surface;

Figure 5 is a cross-sectional view, on an enlarged scale, taken along the line 5—5 of Figure 1, looking in the direction indicated by the arrows; and Figure 6 is a view similar to that of Figure 2, showing the load supporting wheels of the conveyor supported out of contact with the supporting surface and with the conveyor positioning wheels in contact with such surface.

Figure 3:
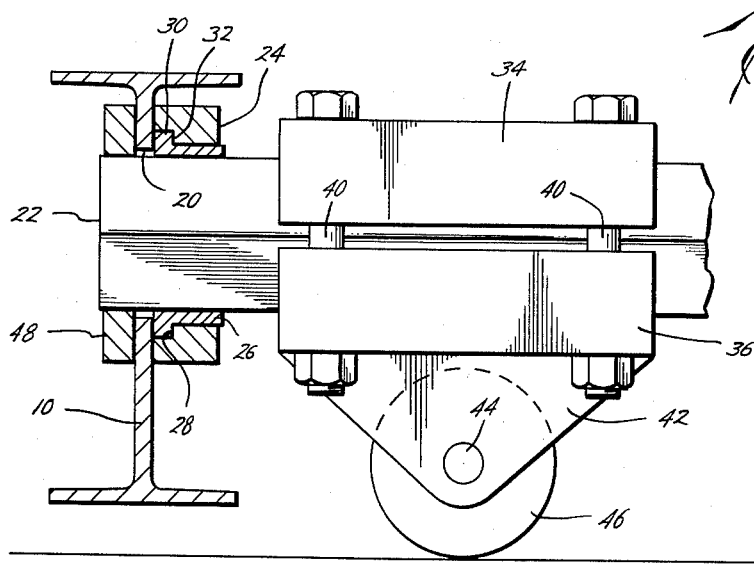
Figure 3 is a cross-sectional view, on an enlarged scale, taken along the line 3—3 of Figure 2, looking in the direction indicated by the arrows.

Referring now to the drawings in greater detail, the conveyor of the invention comprises a frame, preferably of rectangular shape, having side and end frame members 10 and 12, respectively, connected together at their ends, in any suitable manner, as by welding or the like. At the corners the frame may be strengthened by suitable gusset plates 14, welded or otherwise secured to the side and end frame members. The side and end frame members may be of any desired type, such as the I-beams shown in the drawings, and the frame may be of any desired length and width and may also be provided with one or more cross members, such as that indicated at 16, connecting together the side frame members 10 mediate their ends, and with centrally located, longitudinally disposed frame members 18, connecting the end frame members 12 with the cross members 16.

The side frame members 10 and intermediate longitudinally frame members 18 are provided with openings, such as the openings 20, shown in Figure 2, positioned in lateral alignment and through which wheel carrying shafts 22 extend, the shafts 22 preferably being of rectangular cross-section, and being mounted for rotation by means of bearing members 24, welded or otherwise secured to the webs of the frame members in concentric relation to the openings 20, and in which bearing elements 26 on the square shafts are rotatably carried as best seen in Figure 3 of the drawings. Each of the bearing members 24 has an internal annular recess forming a shoulder 28, and the bearing elements 26 are formed with external annular enlargements 30, forming shoulders 32 positioned for engagement with the shoulders 28 to hold the bearing elements in the members 24. Each of the shafts 22 has mounted thereon a number of wheel carrying heads, formed in two parts, 34 and 36, each of which is provided with a right angled notch 38 whose maximum depth is substantially less than one-half of the distance between opposite corners of the shaft along a diagonal connecting said corners, so that the parts of the head may be assembled on the shaft in the manner best illustrated in Figure 5, with opposite corners of the shaft extending into the right angled notches. The parts of the heads are provided with through openings located to be in registration when the parts are assembled on the shaft, and through which suitable securing means, such as the bolts 40 may be extended, whereby the parts are clampingly secured to the shaft. The part 36 of the head is provided with spaced flanges 42 extending outwardly from the face of the part remote from the shaft 22 and which flanges are perforated to receive a shaft 44, upon which a wheel or roller 46 is rotatably mounted between the flanges.

The heads of alternate ones of the shafts 22 are arranged in staggered relation relative to the heads of the adjacent shafts, whereby the wheels 46 may be distributed in substantially uniformly spaced relation.

Locking plates 48 are provided for the shafts 22, which plates are provided with longitudinally spaced square openings located to fit the shafts 22, these plates being positioned over the ends of the shafts in contact with the outer faces of the webs of the side frame members, and secured thereto in any desired manner, as by welding, to hold the shafts against rotation with the wheels 46 extending downwardly below the frame in position for engagement with a supporting surface to movably support the frame thereon. By this construction the shafts are held against rotation and the heads are adjustably mounted on the shafts so that other types of heads may be employed on the conveyor, such as heads having a number of different types of wheels thereon, and by removing the locking plates 48 the shafts may be rotated to different positions to position such other types of wheels at locations for engagement with the supporting surface to movably support the conveyor thereon when desired.

All of the wheels 46 are arranged for rotation in the same direction, and in the present illustration the wheels are positioned to permit the frame to be rolled laterally over the supporting surface, so that the conveyor may be rolled into position beneath the transportation container to support the load of such a container on the wheels 46.

For the purpose of moving the conveyor longitudinally to position the same at a location such that it may be rolled beneath a transportation container additional shafts 50, similar to the shafts 22 are provided, which are similarly extended through aligned openings 52 in the web portions of the side frame members, and mounted for rotation in bearings of similar construction to those previously described in connection with the shafts 22. Each of the shafts 50 is provided with a number of wheel supporting heads, formed in two parts 54 and 56, similar to the parts 34 and 36, previously described, and similarly clamped in longitudinally spaced locations on the shafts, each of the parts 56 having a wheel 58 rotatably supported thereon by a shaft 60, which is carried in aligned perforations in flanges 62, similar to the flanges 42 previously described.

Each of the shafts 50 has a gear 64 mounted thereon for rotation with the shaft, and with which a vertically positioned worm 66 intermeshingly is engaged, which worm is rotatably mounted in bearings 68 and 70 carried on the frame. The shaft of the worm 66 is provided at one end with a squared portion 72 by which the worm may be rotated by suitable means, such as a wrench or operating handle having a square opening therein.

Figure 4:
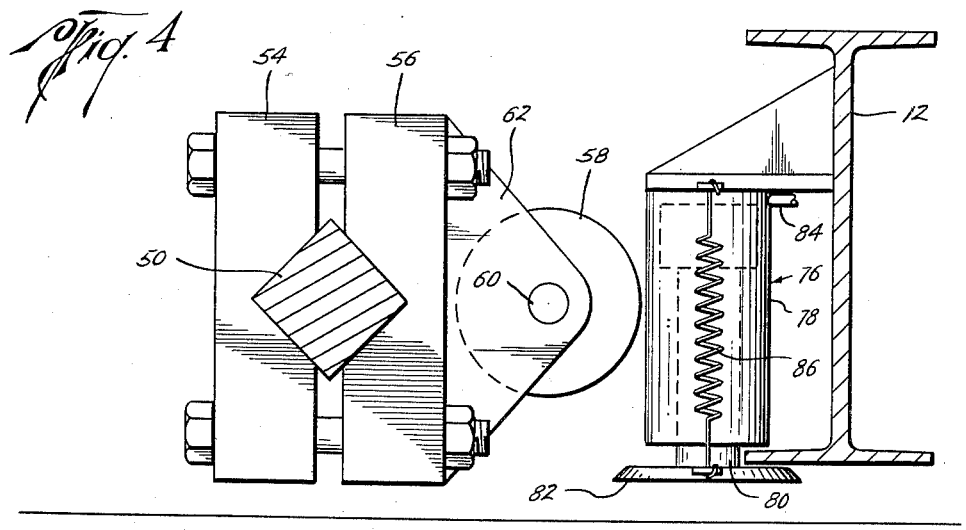
Figure 4 is a cross-sectional view, on an enlarged scale, taken along the line 4—4 of Figure 1, looking in the direction indicated by the arrows.

Suitable means, such as hydraulic jacks 76 are provided near each end of the conveyor and also at suitable locations mediate the ends thereof, whereby the conveyor may be supported on the supporting surface independently of the wheels 46 or 58. Each of the hydraulic jacks may have a vertically positioned pressure fluid cylinder 78, as shown in Figure 4 of the drawings, suitably mounted on the frame, and within which a plunger 80 is movably positioned having at its lower end a foot 82 positioned for engagement with the supporting surface when the plunger is extended, to elevate the conveyor above the supporting surface, as seen in Figure 6 of the drawings. Each of the pressure fluid cylinders has a pressure fluid supply pipe 84 near its upper end leading to a suitable source of fluid under pressure, whereby such fluid may be supplied to and exhausted from the cylinder to actuate the plunger. Each of the hydraulic jacks may also be provided with a coil spring 86, or the like, connected to the cylinder 78 and to the foot 82, and which functions to yieldingly urge the plunger toward retracted position in the cylinder.

When the load of a transportation container is on the conveyor and the wheels 46 are in engagement with the supporting surface to permit the container to be rolled there over the wheels 58 will be in their elevated positions, as best seen in Figure 5 of the drawings, so that the entire load of the container is borne by the wheels 46. When the conveyor is to be moved longitudinally to position the same at a location ot be rolled beneath a transportation container, pressure fluid is admitted to the cylinder 78 through the supply pipe 84 to actuate the plungers 80 to engage the feet 82 with the supporting surface and thereafter to elevate the conveyor above the supporting surface to disengage the rollers 46 therefrom, as illustrated in Figure 6. The worms 66 may then be operated to rotate the gears 64, to turn the shafts 50, to position the wheels 58 for engagement with the supporting surface to permit the conveyor to be rolled longitudinally thereover. It will be noted that the shafts 50 are positioned lower on the frame than are the shafts 22, so that when the wheels 58 are in their active positions extending downwardly for engagement with the supporting surface to support the frame thereon the wheels 46 will be out of contact with the supporting surface.

By exhausting the pressure fluid from the cylinder 78 through the supply pipes 84 the conveyor may be lowered onto the supporting surface to be supported thereon for longitudinal movement on the wheels 58. After the conveyor has been moved longitudinally to the desired location, the hydraulic jacks 76 may again be actuated to elevate the conveyor off of the wheels 58, whereupon these wheels may be moved to their retracted or inactive positions, as illustrated in Figure 5 by rotation of the worm 66, and upon exhausting the pressure fluid from the cylinders 78 the conveyor may be lowered onto the supporting surface to be supported thereon by the wheels 46 for lateral movement to position the conveyor beneath a transportation container to be supported thereon.

It will be understood that the conveyor of the invention is to be used with transportation containers, not shown, of a suitable type which may be raised above a supporting surface, as by means of hydraulic jacks, to permit the insertion of the conveyor beneath the container and its removal therefrom.

It will thus be seen that the invention, constructed and operated in the manner described above, provides a wheeled conveyor for transportation containers which is easily moved about and by which heavy loads may be uniformly distributed over a relatively large area so that the same will have ample support under all conditions, such as the transferring of the load from one supporting surface to another which may be spaced therefrom or located at a slightly different level.

The invention has been disclosed here in connection with a certain specific embodiment of the same, but it will be understood that this is intended by way of illustration only, and that numerous changes can be made in the construction and arrangement of the various parts within the spirit of the invention and the scope of the appended claims.

Having thus clearly shown and described the invention, what is claimed as new and desired to be secured by Letters Patent is:

1. A conveyor comprising a frame of generally rectangular shape, longitudinally spaced, parallel shafts extending from side to side of and rotatably mounted on the frame, wheels mounted on the shafts for movement with the shafts upon rotation of the shafts into and out of positions for engagement with a supporting surface to support the frame for movement over said surface, the wheels on certain of said shafts extending downwardly from the frame when in frame supporting positions a greater distance than and being arranged to support the frame for movement in a different direction than the wheels on others of said shafts, means for holding said others of said shafts against rotation with the wheels thereof in frame supporting positions, and means for supporting the frame at an elevation independently of said wheels.

2. A conveyor comprising a frame of generally rectangular shape, sets of longitudinally spaced, parallel shafts extending from side to side of and rotatably mounted on said frame, wheels mounted on the shafts for movement with the shafts upon rotation of the shafts into and out of positions for engagement with a supporting surface to support the frame for movement over said surface, the wheels of one of said sets extending downwardly from the frame a greater distance than the wheels of the other of said sets when the wheels of said sets are in frame supporting postions, means for rotating the shafts of said one of said sets independently of the shafts of the other of said sets, and means for holding the shafts of said other of said sets against rotation with the wheels thereof in frame supporting positions.

3. A conveyor comprising a frame of generally rectangular shape, sets of longitudinally spaced, parallel shafts extending from side to side of and rotatably mounted on said frame, wheels mounted on the shafts for movement with the shafts upon rotation of the shafts into and out of positions for engagement with a supporting surface to support the frame for movement over said surface, the wheels of one of said sets extending downwardly from the frame a greater distance than the wheels of the other of said sets when the wheels of said sets are in frame supporting positions, means for rotating the shafts of said one of said sets independently of the shafts of the other of said sets, means for holding the shafts of said other of said sets against rotation with the wheels thereof in frame supporting positions and means for supporting the frame above said surface with all of said wheels out of contact with said surface when the wheels are in frame supporting positions.

References Cited in the file of this patent

UNITED STATES PATENTS

| | | |
|---|---|---|
| 669,222 | Ruher | Mar. 5, 1901 |
| 1,890,361 | Beattie | Dec. 6, 1932 |
| 2,103,670 | Hammar | Dec. 28, 1937 |
| 2,461,479 | Moffat | Feb. 8, 1949 |
| 2,664,039 | Heckathorn | Dec. 29, 1953 |